Patented Mar. 22, 1927.

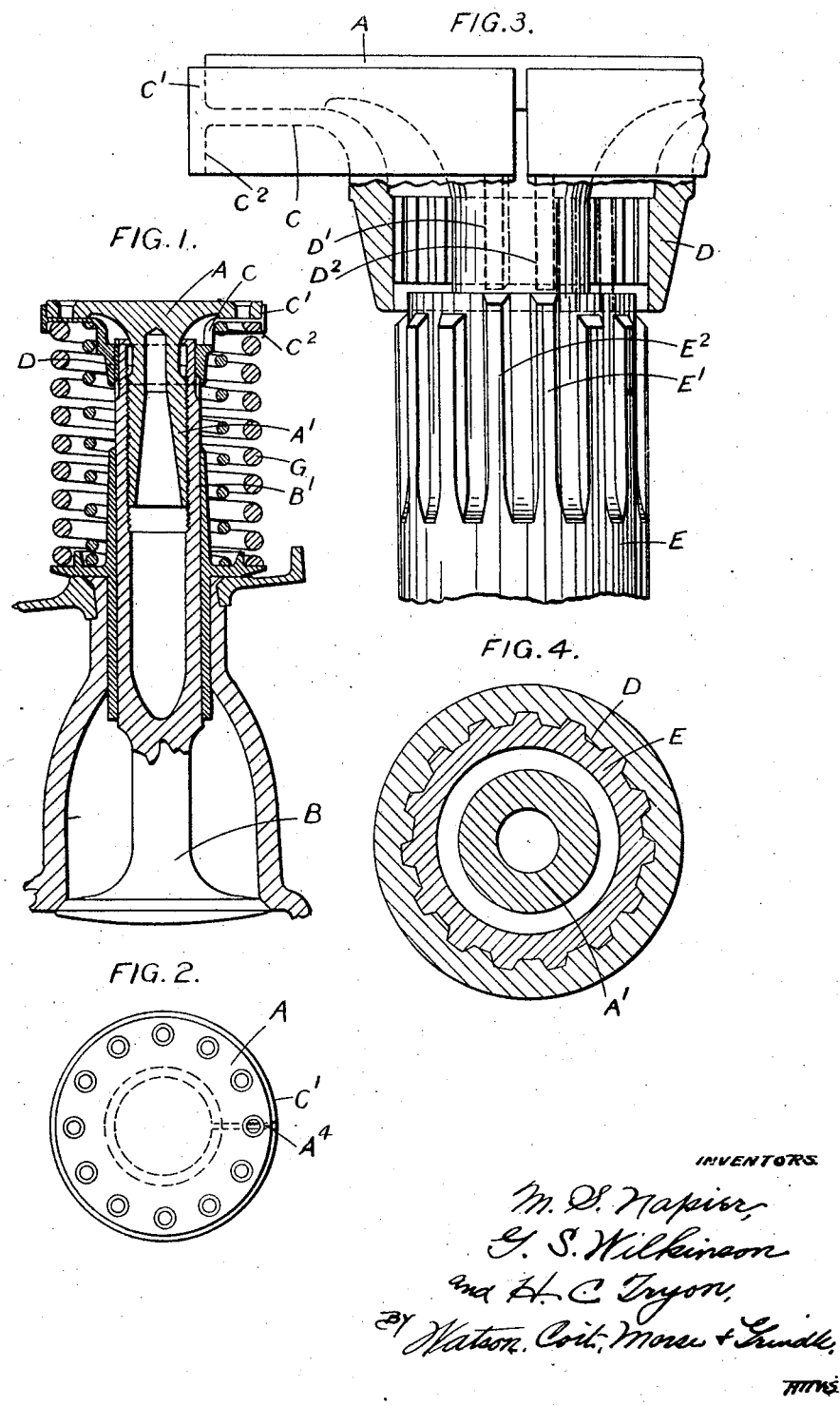

1,622,203

UNITED STATES PATENT OFFICE.

MONTAGUE STANLEY NAPIER, OF CANNES, FRANCE, AND GEORGE SHAKESPEARE WILKINSON AND HENRY CHRISTOPHER TRYON, OF LONDON, ENGLAND, ASSIGNORS TO D. NAPIER & SON LIMITED, OF LONDON, ENGLAND, A COMPANY OF GREAT BRITAIN.

LOCKING DEVICE FOR ADJUSTABLE RODS, SPINDLES, AND THE LIKE.

Application filed September 3, 1925, Serial No. 54,342, and in Great Britain December 23, 1924.

This invention relates to devices for locking the two engaging parts of an adjustable rod, spindle or the like in their position of adjustment and has for its object to provide an improved locking device of the kind in which a member in frictional engagement with one screwthreaded part of a rod is connected by a key or its equivalent to the other screwthreaded part. The invention is particularly but not exclusively applicable to valve spindles of internal combustion engines.

According to the present invention the externally screwthreaded part carries a locking member which is normally in frictional engagement therewith and is provided with a tubular extension or collar having a series of internal splines adapted to engage a similar series of splines which surround the adjacent end of the internally screwthreaded part. When the invention is applied to an adjustable valve spindle only one or not more than two adjacent splines preferably extend right up to the end of the member on which they are formed and the locking ring is initially so set with relation to the member it frictionally engages with that when the two screwthreaded members are brought towards one another, the projecting splines on the locking ring only just pass the projecting or long splines on the end of the valve spindle or like member. Hence, on the completion of a further full turn of the screwthreaded member these splines will overlap and therefore engage to a full extent owing to the relative longitudinal movement which has thus taken place between the two screwthreaded members.

Continued rotation of the screwthreaded members after overcoming the friction of the split locking ring causes the splined ring to slide down the other splined member without risk of the splines being out of alignment. As the splined ring is normally in frictional engagement with one screwthreaded member and is now also in positive engagement with the splined end of the other screwthreaded member, rotary movement between the screwthreaded members is prevented except when sufficient force is applied as by a wrench to move the frictionally engaged surfaces over each other.

To facilitate assembly of the parts the locking ring has a notch or saw cut by means of which it can be spread to release its frictional hold upon the valve tappet disc or like member and the latter carries a pointer or similar indicator, these two parts being so set that when the pointer is opposite the notch, the long splines on the ring will be in the correct position to scrape past the long splines on the internally screwthreaded member. The split ring and the valve head thus move as a unit until the long spline is in full engagement whereafter relatively rotary movement between the two screwthreaded members can only occur after the frictional engagement between the split ring and the valve head has been overcome. When this has taken place, the split ring and its splined collar, being engaged by the external splines on the valve spindle, will participate in the longitudinal movement of the valve tappet disc without of course rotating therewith.

The invention is shown as applied to the valve of an internal combustion engine by way of example in the accompanying drawings in which :—

Figure 1 is a sectional elevation of a valve with the invention applied to the tappet disc thereof.

Figure 2 is a plan of the tappet disc and locking ring therefor.

Figure 3 is an elevation on an enlarged scale showing the upper end of the valve spindle, the locking ring being shown in section thereon and Figure 4 is a cross section through the locking ring and valve spindle on the same scale as Figure 3.

In the construction illustrated the tappet disc A has a stem $A^1$ which is externally screwthreaded to engage the correspondingly internally screwthreaded stem $B^1$ of the valve B. The circumferential edge of the tappet disc A is constantly engaged by an upwardly projecting flange $C^1$ of a split ring or annular locking member C into which the disc is sprung and on its under side the ring C carries an internally splined collar or tubular portion D adapted to engage the correspondingly splined upper end E of the valve spindle $B^1$. The split ring is further provided with a downwardly extending flange $C^2$ which serves to enclose the upper end of the valve spring or springs G, and a series of holes $A^3$ is formed in the disc A which enable the disc and its stem $A^1$ to be rotated relatively to the internally screw-threaded spindle $B^1$ by means of a suitable tool.

As will be seen by reference to Figure 3 only two adjacent splines $E^1$ $E^2$ extend to the end of the hollow valve spindle and similarly only two of the splines $D^1$ $D^2$ on the collar D extend to the outer end thereof. The initial position of the locking ring C upon the tappet disc A is such that when the stem $A^1$ is screwed into the spindle $B^1$, before any of the splines can actually engage or overlap, the end of the long spline $D^2$ on the collar D will just scrape past the end of the long spline $E^2$ on the valve spindle, as shown by dotted lines in Figure 3. The next turn of the valve head or tappet disc relative to the spindle $B^1$ therefore brings the spline $D^1$ into full engagement with the long spline $E^1$ as shown by chain lines in Figure 3, so that any risk of the splines only partially engaging is completely obviated.

The tappet disc A preferably carries an indicating line or pointer $A^4$ so positioned thereon that when this is in alignment with the saw cut or slit in the ring C the splined collar is correctly set.

Once the long splines have fully engaged in the manner described the disc A can only be further rotated by overcoming the friction between the edge and under surface of this disc and the split ring C and the parts may be so constructed that whereas such frictional engagement can be overcome by means of a ratchet brace or like tool it is impossible otherwise to rotate the disc and its stem relatively to the split ring C.

Hence, as soon as the splines are in full engagement, continued rotation of the tappet disc moves the ring C and its collar longitudinally upon the valve spindle but directly the tool is removed or intentional rotation of the tappet disc ceases, the locking ring will regain its grip upon the tappet disc and, through the splines it carries, prevent rotational and thus relative longitudinal movement between the tappet disc A and the valve spindle $B^1$.

If desired a single long spline may be formed on the locking collar and valve spindle, though with two splines the degree of overlap ensured is increased.

It will be understood that although a tappet disc and valve spindle have been above described and illustrated the invention is equally applicable to brake rods or like articles which are adjusted in length by screwing and that the constructional features of the friction ring may be varied so long as it carries a collar having a series of internal splines adapted to engage a corresponding series of external splines on the internally screw-threaded member.

What we claim as our invention and desire to secure by Letters Patent is:—

1. In a device for locking two screw-threaded parts of an adjustable rod in their position of adjustment, the combination of an externally screwthreaded part, a locking member normally in frictional engagement therewith, a tubular extension on said locking member having a plurality of internal splines of which the majority do not extend to the outer end of the collar, at least one spline extending beyond the rest, an internally screwthreaded part and a plurality of external splines formed around the end of said internally screwthreaded part adjacent the externally screwthreaded part, the majority of said external splines terminating short of the end of the internally screwthreaded member while at least one spline extends beyond the rest as set forth.

2. In a device for locking two screw threaded parts of an adjustable rod in their position of adjustment, the combination of a disc, an externally screwthreaded stem on said disc, a split ring flanged to engage the circumferential edge of said disc, a collar formed integral with the split ring and having a complete series of internal splines, and an internally screwthreaded valve spindle having a corresponding series of external splines at its upper end adapted to engage with the internal splines on the collar, one spline on each member extending further than the others towards the free end of the member upon which it is formed.

In testimony whereof we have signed our names to this specification.

MONTAGUE STANLEY NAPIER.
  GEORGE SHAKESPEARE WILKINSON.
  HENRY CHRISTOPHER TRYON.